July 13, 1965 W. FISHBEIN ETAL 3,195,129
CW RADAR SYSTEM
Filed May 4, 1962 4 Sheets-Sheet 1

INVENTORS,
WILLIAM FISHBEIN &
OTTO E. RITTENBACH.
BY Jack H. Linscott
ATTORNEY.

July 13, 1965  W. FISHBEIN ETAL  3,195,129

CW RADAR SYSTEM

Filed May 4, 1962  4 Sheets-Sheet 2

INVENTORS,
WILLIAM FISHBEIN &
OTTO E. RITTENBACH.

BY Jack H. Linscott

ATTORNEY.

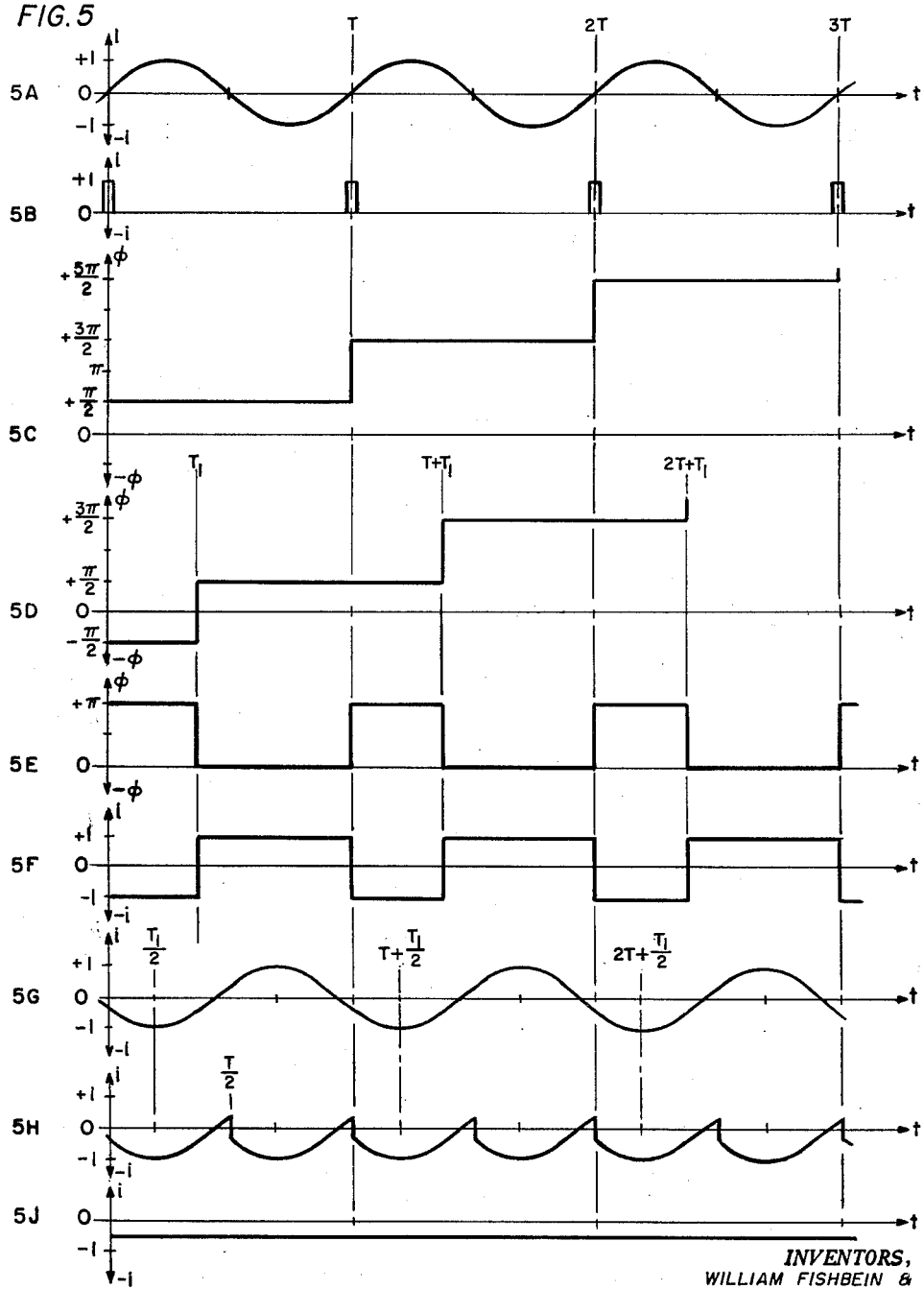

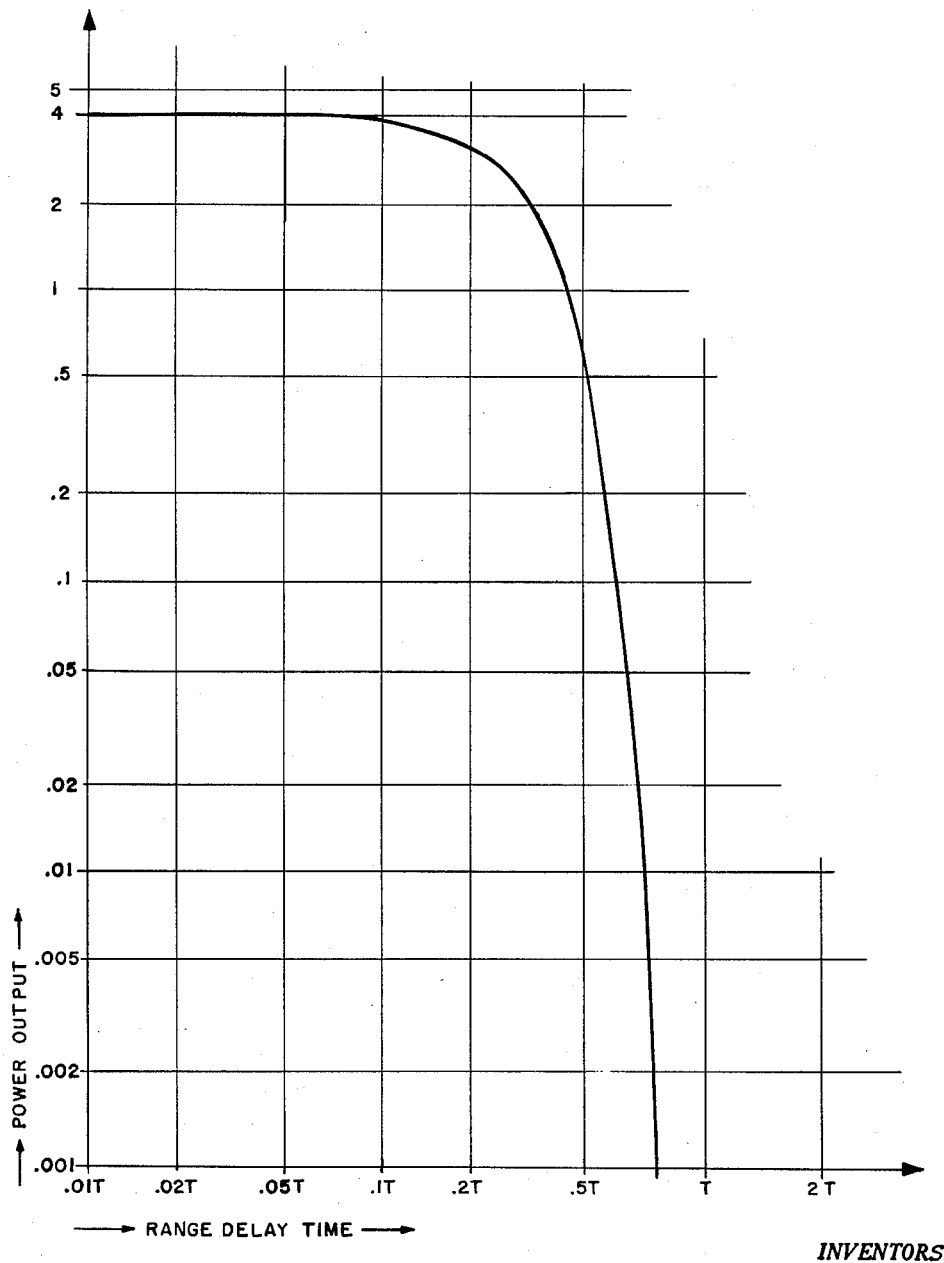

3,195,129
CW RADAR SYSTEM
William Fishbein, New Shrewsbury, and Otto E. Rittenbach, Neptune, N.J., assignors to the United States of America as represented by the Secretary of the Army
Filed May 4, 1962, Ser. No. 192,608
12 Claims. (Cl. 343—8)
(Granted under Title 35, U.S. Code (1952), sec. 266)

The invention described herein may be manufactured and used by or for the Government for governmental purposes without the payment of any royalty thereon.

This invention relates to CW radar systems and more particularly to a correlation radar using phase reversal and frequency modulation.

Basically, radar transmission is either pulse modulated or continuous. The conventional pulse radar has two shortcomings. First, since the pulse width and pulse repetition frequency are constrained by resolution and maximum range requirements, the average transmitted power of a conventional pulse radar can be increased only by increasing the peak transmitter power. Second, the short pulse width requires that the target Doppler frequency be determined by pulse to pulse measurement. The limitation proposed by the sampling theorem then prevents unambiguous measurement of Doppler frequencies higher than one-half the pulse repetition frequency. While the above mentioned limitations of pulsed radar can be overcome by the use of CW radar, this type radar also presents certain disadvantages. By utilizing the Doppler effect, CW radar may be used for detecting moving targets but it can neither measure range nor resolve targets in range without complicated modification. Secondly, due to the variation of target echo strength with the fourth power of range, closed in targets can drown out marginal signals. Another disadvantage resides in the fact that the sensitivity of CW radar systems is generally poor.

It is an object of the present invention to provide a CW Doppler radar wherein the above mentioned limitations are overcome.

It is a further object of the present invention to overcome the above mentioned limitations by suitable frequency modulation of the transmitted energy and demodulation of the received signal.

In accordance with one embodiment of the invention, the CW Doppler radar system includes means for generating an IF signal at a frequency such that its period is a function of the maximum range of target echoes to be detected, a source of relatively high frequency RF energy, and means responsive to the IF signal and the RF signal energy for producing a continuous wave of RF signal energy having its phase alternately reversed 180° at a rate corresponding to one-half the frequency of the IF signal. Also included is a common antenna for reception and transmission and duplexer means, a circulator for example, coupled to the antenna and responsive to the alternately phase reversed RF signal energy whereby at any instant a portion of the RF signal energy is coupled to the antenna for transmission and a portion of the RF signal energy leaks through the duplexer means to an output port thereof, the duplexer means also being responsive to the RF signal energy reflected from a moving target in the path of the transmitted energy such that the reflected RF energy is combined with the leak-through signal energy. In addition there are included means for producing a video-form beat signal from the combined reflected and transmitted leak-through energy, a broad-band amplifier for amplifying the video-form beat signal, means responsive to the amplified video-form beat signal and the IF signal for producing a beat signal having a current component corresponding to the Doppler frequency of the detected moving target, and means for amplifying said current component.

In accordance with another embodiment of the invention, the CW Doppler radar system includes means for generating an IF signal at a frequency such that its period is a function of the maximum range of targets to be detected, a source of relatively high frequency RF energy, and means responsive to the IF signal for modulating the frequency of the RF energy such that the RF signal energy output is cyclically shifted in phase 180° at the instant each cycle of the IF signal crosses zero from a negative to a positive value. Also included is a common antenna for reception and transmission, and duplexer means coupled to the antenna and responsive of the phase shifted RF energy whereby at any instant a portion of the RF signal energy is coupled to the antenna for transmission and a portion of the RF signal energy leaks through the duplexer means to an output port thereof, the duplexer means also being responsive to the RF signal energy reflected from a moving target in the path of the transmitted energy such that the reflected RF energy is combined with the leak-through energy in said output port. Included further are means for producing a video-form beat signal from the combined reflected and leak-through energy, a narrow-band amplifier responsive to the video-form beat signal and adapted to pass only a component of the video-form beat signal corresponding to the IF signal frequency, means responsive to the IF component signal and the IF signal for producing a beat signal having a current component corresponding to the Doppler frequency of the moving target, and means for amplifying the current component.

For a better understanding of the invention, together with other and further objects thereof, reference is had to the following description taken in connection with the accompanying drawing in which:

FIGS. 4 and 5 are a group of explanatory curves for describing the operation of the system shown in FIG. 3; and FIG. 6 is a graph illustrating the relationship between output power of the system shown in FIG. 3 and target distance.

Figure 1:
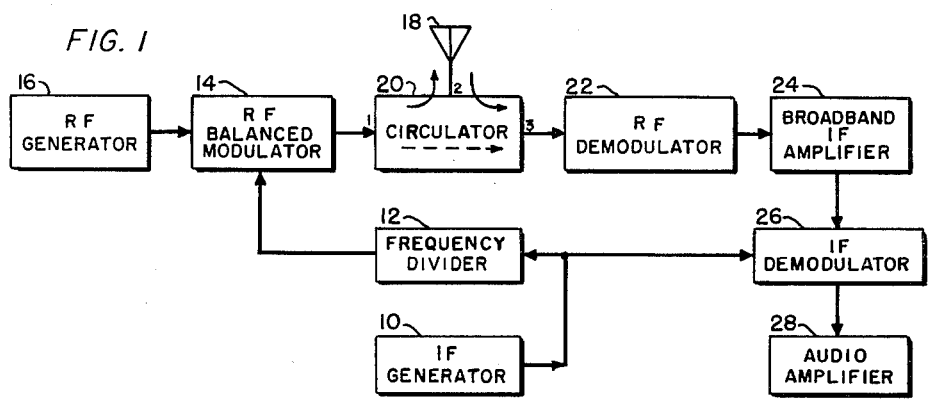
FIG. 1 is a schematic block diagram of one embodiment of the invention.

Referring now to FIG. 1 of the drawing, at 10 there is shown an IF generator adapted to provide a signal output at a frequency which is a function of the delay time of the maximum range target to be detected. For optimum results, the IF frequency is chosen such that it is equal to $1/T$ where $T/2$ is equal to the delay time of the maximum range target. The IF generator 10 frequency output is applied to a one-half frequency divider 12, the output of which comprises one of two inputs to a phase reversal type RF balanced modulator 14. This type of balanced modulator is well known in the art and one such modulator is shown in FIG. 12 of U.S. Patent No. 2,977,417 issued to M. L. Doelz et al., March 28, 1961. The other input to RF balanced modulator 14 is derived from RF energy source 16 which may comprise a magnetron or klystron or any other oscillator well known in the art. The operation of RF balanced modulator 14 is such that for each half cycle of the output of frequency divider circuit 12, the phase of the RF signal output from balanced modulator 14 will be alternately shifted 180° to provide two output phase levels for the RF signal output derived from modulator 14.

Thus, for one-half cycle of frequency divider 12 output, the RF output from balanced modulator 14 is 180° out of phase with the RF balanced modulator output for the next half cycle of the frequency divider 12 output, and this is cyclically repeated to provide RF signal outputs alternately differing in phase by 180°. The alternately shifted RF signal output derived from balanced modulator 14 is applied for transmission to antenna 18 through a duplexer such as a conventional three-port circulator 20. As shown, circulator 20 is arranged such that RF signal energy entering port 1 from balanced modulator 14 is directed to antenna 18 for transmission and also leaks through circulator 20 to port 3 thereof, and any targets in the path of the transmitted RF energy are returned to antenna 18 and are passed through to circulator port 3. The leak-through signal is used as a local oscillator frequency to combine with the delayed signals which are returning from external moving targets, the antenna 18 of course being utilized for both transmission and reception.

The RF leak-through signals and the incoming or received target signals are combined at port 3 of circulator 20 and applied to RF demodulator 22 which produces an output video waveform representing the beat signal of the combined RF inputs. The output of RF demodulator 22 is amplified in IF amplifier 24 which is adapted to pass and amplify a relatively broad-band spectrum centered about the IF frequency as determined by the output of IF generator 10. For example, broadband IF amplifier 24 should preferably be designed to pass and amplify signals harmonically related to the IF frequency output from IF generator 10 up to and including at least the third harmonic thereof. The video wave output of broad-band IF amplifier 24 is mixed with the IF signal from IF generator 10 in IF demodulator 26 to recover a current component corresponding to the Doppler frequency of the moving target. The action of IF demodulator 26 is such that the polarity of input signals from IF amplifier 24 and the output signals from IF demodulator 26 are the same when the reference IF signal from IF generator 10 is positive. When the IF reference signal is negative, the input and output polarities are opposite. As shown, the output of IF demodulator 26 is applied to audio amplifier 28 to provide the amplified Doppler frequency.

Figure 2:
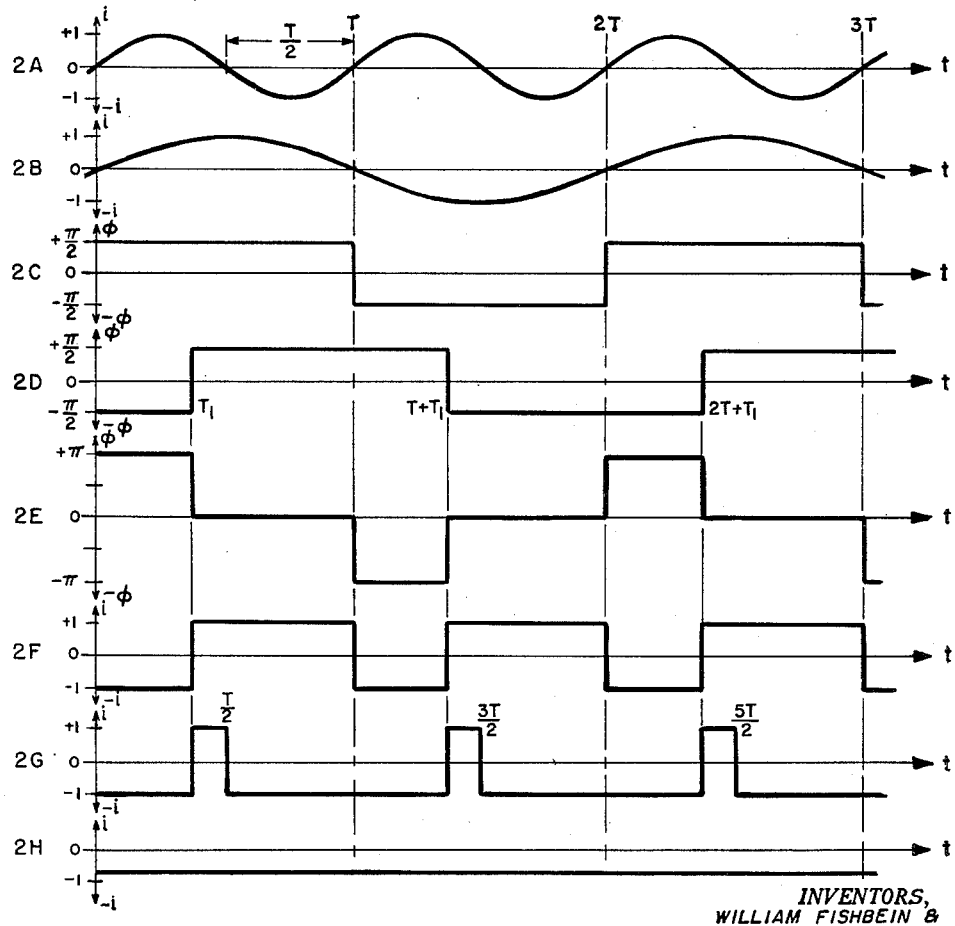
FIG. 2 shows a series of curves for explaining the operation of the system shown in FIG. 1.

In explaining the operation of the system, reference is made to the curves of FIG. 2. FIG. 2A shows the IF signal derived from IF generator 10 with a frequency $f=1/T$. The output of the frequency divider 12 is shown in FIG. 2B as being one-half the IF frequency or $T/2$. The RF phase output of RF balanced modulator 14 is shown in FIG. 2C. Since, as hereinabove mentioned, the RF output from balanced modulator 14 is alternately shifted 180° for each half cycle output of the frequency divider 12, the waveform of FIG. 2C represents a plot of the relative phase of the output of RF modulator 14. In phase plot 2C, it is understood that if the upper of two levels is indicated, the RF output has one given phase, and if the lower level is indicated, it means that the RF output phase has been either advanced or retarded by 180° from the phase corresponding to the upper level. In other words, the duration of the upper levels of FIG. 2C represent the duration of one phase output of the suppressed carrier RF signal and the lower levels of FIG. 2C represent the duration of the 180° phase reversed suppressed carrier RF signal output. For convenience, the RF output from balanced modulator 14 is shown as being alternately shifted between $-\pi/2$ and $+\pi/2$. FIG. 2D shows the RF phase of a target signal at a range corresponding to a time delay $T_1$ for the case where the range is a multiple of one-half an RF wavelength. FIG. 2E illustrates the RF phase difference between the transmitted and received signals and FIG. 2F shows the output wave of RF demodulator 22 which results from the mixing between target and leakage signals. In the case where $T_1$ is equal to $T/2$, the output of RF demodulator 22 is a square wave with a frequency twice that of the transmitter modulation frequency. FIG. 2G shows the output waveform of IF demodulator 26 and the current component corresponding to the Doppler frequency of the target is shown in FIG. 2H. In the case where $T_1=T/2$, the frequency required for IF demodulation is twice that required for RF modulation. It is to be noted that the magnitude of the current component is a maximum and represents all the energy in the received signal when $T_1$ is equal to an odd multiple of $T/2$. For this reason it is usually advisable to make $T/2$ equal to the delay time of the maximum range target. As in the usual CW Doppler systems, with every change in target range of one-half an RF wavelength, the current component goes through a full cosine cycle. While the linear variations of current between multiples of $T/2$ can be used to measure target range when only one target is present, the range of multiple targets can be resolved by means of their Doppler frequencies. This can be accomplished by varying the IF frequency of generator 10 until the current or Doppler frequency output of a desired target is a minimum or a maximum. Another method is to shift the phase of the IF reference input to the IF demodulator 26. A third approach is to use a square wave which looks like that of FIG. 2F as an IF reference and vary the relative lengths of the negative and positive portions.

Figure 3:
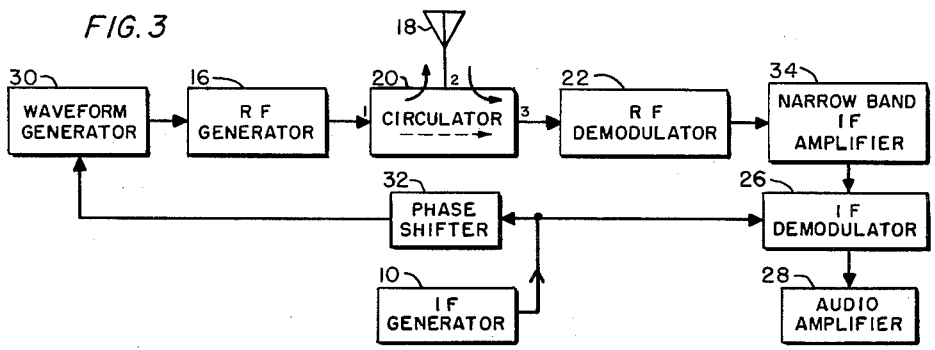
FIG. 3 is a schematic block diagram of another embodiment of the invention.
Figure 4:
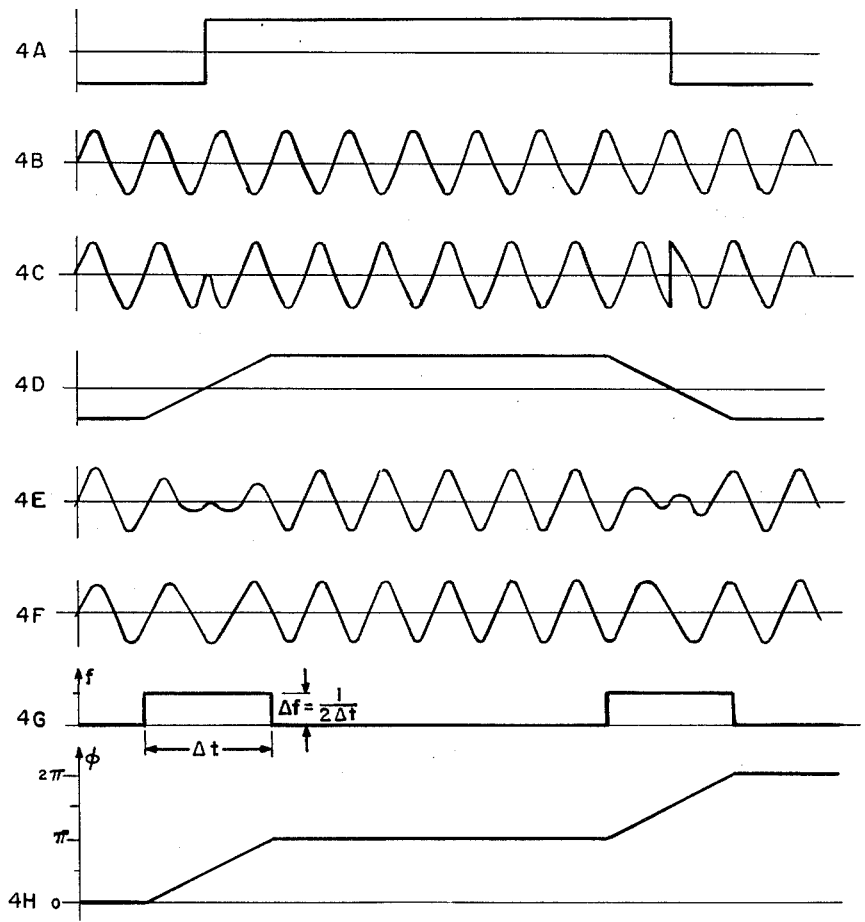

FIG. 3 shows another embodiment of the invention wherein frequency division is not required and the output signal is nearly constant with range. In FIG. 3, components identical to that shown in FIG. 1 are designated by the same reference numerals. Referring now to FIG. 3, there is shown at 10 an IF generator adapted to provide a signal output at a frequency which is a function of the delay time of the maximum range target to be detected. As in FIG. 1, for optimum results the IF frequency is chosen such that it is equal to $1/T$ where $T/2$ is equal to the delay time of the maximum range target. RF generator 16 is modulated at an IF rate in the following manner. The IF output of generator 10 is applied to a waveform generator 30 through a phase shifter 32. The waveform generator 30 is adjusted so that the initiation of the RF modulating waveform is made to cyclically occur at each instant that each cycle of the IF frequency crosses zero in going from a negative value to a positive value which occurs at successive multiples of T. Waveform generator 30 is arranged preferably to provide a pulse whose duration is such that when applied to RF generator 16, the output frequency of RF generator 16, for the pulse duration only, will be changed by an amount which will cause the phase of the RF oscillation to shift by 180°. This can best be seen by referring to the curves shown in FIG. 4. FIGS. 4A, 4B and 4C show the waveforms in an ideal balanced modulator. It is to be noted that the phase of the RF is inverted instantaneously. However, in the practical situation, due to bandwidth limitations, the modulation waveform looks more like that of FIG. 4D. As a result, the modulated RF is shown to decrease to zero and then increase with phase reversal as shown in FIG. 4E. A finite time is then required to reverse phase and it is during this time that the pulse from waveform generator 30 is applied to change the frequency of the RF generator 16 by an amount which will cause the phase of the output thereof to shift by 180°. This may be accomplished if during the switching time $\Delta t$, FIG. 4G, the frequency $\Delta f$ is changed by an amount $\frac{1}{2}\Delta t$. For example, assume RF generator 16 to be a conventional klystron operating at a frequency of 10,000 mc. with a prescribed repeller plate voltage. If for the duration $\Delta t$ the repeller plate voltage is pulsed so that the frequency output is 10,001 mc. for the duration $\Delta t$ and then returned to its prescribed voltage, the frequency output of generator 16 will then continue at 10,000 mc. but will be shifted in phase by 180°. Mathematically this can be shown as follows. If $f$ is the normal operating frequency of the generator 16 having a phase $\phi$, and if $\Delta f$ is the changed frequency for duration $\Delta t$, then the change in phase $\Delta \phi$ may be expressed as $\Delta\phi=2\pi(f+\Delta f)\Delta t - 2\pi f \Delta t$ or $\Delta\phi=2\pi\Delta f \Delta t$. Now if $$\Delta f = \frac{1}{2\Delta t}$$

then $\Delta \phi = \pi$ or 180°. For optimum operation the modulation pulse duration from waveform generator 30 is made short relative to the period of the IF frequency derived from IF generator. It is to be noted that this type of frequency modulation produces a single side band output. In other words, if the waveform of FIG. 4E is put through a filter which removes all frequencies higher than that of RF generator 16, the waveform of FIG. 4F results. It can be seen that, effectively, the phase of the RF signal is shifted by 180° as schematically represented in FIG. 4H. The remainder of the system shown in FIG. 3 is similar to that shown in FIG. 1 except that a narrow-band IF amplifier 34 is substituted for the broad-band amplifier 24 shown in FIG. 1. Narrow-band IF amplifier 34 is tuned to only pass a signal component at the fundamental IF frequency and reject any harmonics thereof. Phase shifter 32 is adjusted so that the target signal output of narrow-band IF amplifier 34 is in phase (or 180° out of phase) with the output of IF generator 10 when the target is at maximum range. It is to be understood of course that phase shifter 32 could also be inserted between IF generator 10 and IF demodulator 26 or in any other suitable IF part of the system.

In explaining the operation of FIG. 3 reference is made to the curves shown in FIG. 5. FIG. 5A shows the IF signal derived from IF generator 10 with a frequency $f=1/T$. The relatively short modulating pulse derived from waveform generator 30 is shown in FIG. 5B. The phase output of frequency-modulated RF generator 16 is shown in FIG. 5C, and it can be seen that the RF phase output is shifted 180° for each cyclically applied waveform pulse. FIG. 5D shows the RF phase of a target signal at a range corresponding to a time delay $T_1$ and FIG. 5E illustrates the RF phase difference between the transmitted (leakage) and received signals. FIG. 5F shows the best video-form signal output of RF demodulator 22 which results from the mixing between target and "leakage" signals. It is to be noted that the RF demodulator 22 output in the system shown in FIG. 3 is identical to the RF demodulator 22 output of the system shown in FIG. 1. The output of narrow-band amplifier 34 is shown in FIG. 5G, and since this amplifier passes only the fundamental IF frequency $f$, and rejects any harmonics, the output of narrow-band amplifier 34 is the sine wave as shown. As in the system of FIG. 1 the IF demodulator 26 is arranged such that the polarity of input and output signals are the same when the reference signal is positive, and when the reference signal is negative, the input and output polarities are opposite. The resultant output of IF demodulator 26 is shown in FIG. 5H and the current component derived from IF demodulator 26 corresponding to the Doppler frequency of the target is shown in FIG. 5J. While the system of FIG. 3 shows a rectangular pulse output from waveform generator 30 (FIG. 5B), it has been found that a square wave or sine wave output at the IF signal frequency may also be provided by waveform generator 30 to achieve substantially the same results.

To better understand the function of the CW Doppler radar system of FIG. 3 for producing output signals which are nearly constant with range, the following analysis is presented. Since the output of the narrow-band amplifier 32 is a sine wave, for unity input the normalized current output of the IF amplifier may be given by $$i = \frac{4}{\pi} \sin \frac{\pi T_1}{T} \sin \left[\frac{2\pi t}{T} + \pi\left(\frac{1}{2} + \frac{T_1}{T}\right)\right] \qquad (1)$$

The first sine term represents the peak amplitude of the output current as a function of the ratio delay time, $T_1$, to the period of the IF generator, $T$. The second sine term contains the phase of the IF amplifier output as a function of $T_1/T$. When $T_1$ is equal to $T/2$, the peak current is a maximum and represents $8/\pi^2$ of the total energy in the received signal. The output waveform of IF demodulator 26 shown in FIG. 5H is the result of multiplying Equation 1 with a unity amplitude square wave having the same zero points as the IF generator 10 output. The normalized current output of the IF demodulator is $$i = \frac{8}{\pi^2}\left(\sin \frac{\pi T_1}{T}\right)^2 \qquad (2)$$

For a target with a range delay time of $T/2$, the normalized current output is $8/\pi^2$. For constant target size and radar parameters, the peak current input to the IF amplifier 34 will vary inversely with the square of the range. The normalized current output of the IF demodulator is then given by $$i = \frac{8}{\pi^2}\left(\frac{\sin \frac{\pi T_1}{T}}{\frac{2T_1}{T}}\right)^2 \qquad (3)$$

For unity resistance, the normalized output power output of IF demodulator 26 is then given by $$P = 4\left(\frac{\sin \frac{\pi T_1}{T}}{\frac{\pi T_1}{T}}\right)^4 \qquad (4)$$

A plot of $P$ vs. $T_1$ is shown in FIG. 6. It is to be noted that when the target delay varies from $0.5T$ to $0.1T$, the system output power varies by less than 8 db. It has been determined that simultaneously the input power varied by 80 db.

While there has been described what is at present considered to be the preferred embodiment of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:
1. A CW Doppler radar sysem comprising,
   means for generating an IF signal at a prescribed frequency such that its period is a function of the maximum range of targets to be detected,
   a source of RF energy having a prescribed frequency,
   means responsive to said IF signal and said RF energy for producing a continuous wave of RF signal energy having its phase alternately reversed 180° at a rate corresponding to one-half the frequency of said prescribed IF signal,
   a common antenna for reception and transmission,
   duplexer means coupled to said antenna and responsive to said RF signal energy whereby at any instant a portion of said RF signal energy is coupled to said antenna for transmission and a portion of said RF signal energy leaks through said duplexer means to an output port thereof, said duplexer means being also responsive to the RF signal energy reflected from a moving target in the path of the transmitted RF signal energy such that the reflected RF signal energy is combined with said leak-through energy in said output port, means for producing a video-form beat signal from said combined reflected and leak-through energy, a broad-band amplifier for amplifying said video-form beat signal, means responsive to said amplified video-form beat signal and said prescribed IF signal for producing a beat signal having a current component corresponding to the Doppler frequency of said detected moving target, and means for amplifying said current component.

2. The system in accordance with claim 1 wherein said alternately reversing phase means comprises a phase reversal type RF balanced modulator.

3. The system in accordance with claim 1 wherein said broad-band amplifier is responsive to at least the third harmonic of said IF signal.

4. The system in accordance with claim 1 wherein said IF signal frequency is equal to $1/T$ where $T/2$ corresponds to the delay time of the maximum range target to be detected.

5. The system in accordance with claim 1 wherein said duplexer means comprises a circulator.

6. A CW Doppler radar system comprising, means for generating a prescribed IF signal at a prescribed frequency such that its period is a function of the maximum range of targets to be detected, a source of RF energy having a prescribed frequency, means responsive to said IF signal for producing a signal at one-half the frequency of said prescribed IF signal, means responsive to said RF energy and said one-half frequency signal for producing a continuous wave of RF signal energy having it phase alternately reversed 180° at said one-half frequency rate, a common antenna for reception and transmission, duplexer means coupled to said antenna and responsive to said RF signal energy whereby at any instant a portion of said RF signal energy is coupled to said antenna for transmission and a portion of said RF signal energy leaks through said duplexer means to an output port thereof, said duplexer means being also responsive to the RF signal energy reflected from a moving target in the path of the transmitted energy such that the reflected RF signal energy is combined with said leak-through energy in said output port, means for producing a video-form beat signal from said combined reflected and transmitted leak-through energy, a broad-band amplifier for amplifying said video-form beat signal, means responsive to said amplified video-form beat signal and said IF signal for producing a beat signal having a current component corresponding to the Doppler frequency of said moving target, and means for amplifying said current component.

7. A CW Doppler radar system comprising, an IF signal having a frequency $1/T$ where $T/2$ corresponds to the delay time of the maximum range target to be detected.

a source of RF energy having a prescribed frequency, means responsive to said IF signal for producing a signal at one-half the frequency of said IF signal, a phase reversal RF balanced modulator responsive to said one-half IF signal frequency and said RF energy for producing a suppressed carrier RF signal having its phase alternately reversed 180° at said one-half IF frequency rate, a common antenna for reception and transmission, an RF demodulator, a duplexer having one port connected to said antenna and the remaining ports being respectively connected to the output of said RF balanced modulator and the input to said RF demodulator, said duplexer being arranged such that RF signal energy from said RF balanced modulator is transmitted through said antenna and a portion thereof leaks through to said RF demodulator to provide a local oscillator frequency signal, and RF signal reflected energy is passed only to said RF demodulator, said reflected signal being delayed with respect to the leak-through RF signal, said leak-through signal and said reflected signal being combined in said demodulator to produce a video-form beat signal, a broad-band amplifier for amplifying said video-form beat signal, an IF demodulator responsive to said IF signal and said amplified video-form beat signal to produce a beat signal having a current component corresponding to the Doppler frequency of the reflected target signal, and an audio amplifier for amplifying said current component.

8. A CW Doppler radar system comprising, means for generating an IF signal at a frequency such that its period is a function of the maximum range of targets to be detected, a source of RF energy having a prescribed frequency, means responsive to said IF signal for modulating the frequency of said source RF energy such that the frequency of the source RF energy is changed by an amount to produce RF signal energy which is cyclically shifted in phase 180° at the instant each cycle of the IF signal crosses zero from a negative to a positive value, a common antenna for reception and transmission, duplexer means coupled to said antenna and responsive to said phase shifted RF signal energy whereby at any instant a portion of said RF signal energy is coupled to said antenna for transmission and a portion of said RF signal energy leaks through said duplexer means to an output port thereof, said duplexer means also being responsive to the RF energy reflected from a moving target in the path of the transmitted energy such that the reflected RF energy is combined with said leak-through energy in said output port, means for producing a video-form beat signal from said combined reflected and transmitted leak-through energy, a narrow-band amplifier responsive to said video-form beat signal and adapted to pass only a component of said video-form beat signal corresponding to said IF frequency, means responsive to said IF component signal and said IF signal for producing a beat signal having a current component corresponding to the Doppler frequency of said moving target, and means for amplifying said current component.

9. The system in accordance with claim 8 wherein the RF modulating signal comprises a pulse of relatively short duration compared to the period of the IF signal frequency.

10. The system in accordance with claim 8 wherein the RF modulating signal comprises a sine wave signal.

11. A CW Doppler radar system comprising, means for generating an IF signal at a frequency such that its period is a function of the maximum range of target echoes to be detected, a source of RF energy having a prescribed frequency, means interconnecting said RF source and said IF generator means for producing a pulse at the beginning of each period of said IF signal, said pulse being of relatively short duration compared to the period of the IF signal frequency and frequency modulating said RF energy such that there is produced RF signal energy which is shifted 180° in phase at the termination of each of said pulses, a common antenna for reception and transmission, duplexer means coupled to said antenna and responsive to said phase shifted RF signal energy whereby at any instant a portion of said RF signal energy is coupled to said antenna for transmission and a portion of said RF signal energy leaks through said duplexer means to an output port thereof, said duplexer means also being responsive to the RF energy reflected from a moving target in the path of the transmitted energy such that the reflected RF energy is combined with said leak-through energy in said output port, means for producing a video-form beat signal from said combined reflected and transmitted energy, a narrow-band amplifier responsive to said video-form beat signal and adapted to pass only a component of said video-form beat signal corresponding to said IF frequency, means responsive to said IF comopnent signal and said IF frequency signal for producing a beat signal having a current component corresponding to the Doppler frequency of said moving target, and means for amplifying said current component.

12. The system in accordance with claim 11 wherein said pulse producing means interconnecting said RF source and said IF generator means comprise a phase shifter and a waveform generator.

No references cited.

CHESTER L. JUSTUS, *Primary Examiner.*